(12) United States Patent  
Pauer et al.

(10) Patent No.: US 8,939,022 B2  
(45) Date of Patent: Jan. 27, 2015

(54) LEVEL INDICATOR

(75) Inventors: Bernd Pauer, Eppstein (DE); Daniela Sasse, Nackenheim (DE)

(73) Assignee: Continental Automotive GmbH, Hannover (DE)

( * ) Notice: Subject to any disclaimer, the term of this patent is extended or adjusted under 35 U.S.C. 154(b) by 820 days.

(21) Appl. No.: 12/595,727

(22) PCT Filed: Apr. 1, 2008

(86) PCT No.: PCT/EP2008/053861  
§ 371 (c)(1),  
(2), (4) Date: Feb. 3, 2010

(87) PCT Pub. No.: WO2008/125478  
PCT Pub. Date: Oct. 23, 2008

(65) Prior Publication Data  
US 2010/0139394 A1  Jun. 10, 2010

(30) Foreign Application Priority Data  
Apr. 11, 2007  (DE) .......................... 10 2007 017 057

(51) Int. Cl.  
*G01F 23/32* (2006.01)  
*G01F 23/36* (2006.01)  
*G01F 23/76* (2006.01)

(52) U.S. Cl.  
CPC .............. *G01F 23/363* (2013.01); *G01F 23/76* (2013.01)  
USPC .......................................................... 73/317

(58) Field of Classification Search  
CPC ......... G01F 23/30; G01F 23/32; G01F 23/36; G01F 23/363; G01F 23/38  
USPC ......................................................... 73/313  
See application file for complete search history.

(56) References Cited

U.S. PATENT DOCUMENTS

| | | | |
|---|---|---|---|
| 1,252,688 A * | 1/1918 | Gelatt | ............................... 74/14 |
| 2,683,783 A | 7/1954 | Palladino, Jr. | |
| 2,690,484 A | 11/1954 | Buchtenkirch | |
| 3,354,719 A | 11/1967 | Taylor et al. | |
| 4,386,406 A * | 5/1983 | Igarashi et al. | ................. 73/313 |
| 4,928,526 A | 5/1990 | Weaver | |
| 5,284,055 A | 2/1994 | Baux et al. | |
| 5,301,550 A | 4/1994 | Shortis | |

(Continued)

FOREIGN PATENT DOCUMENTS

| | | |
|---|---|---|
| DE | 2 148 868 | 5/1972 |
| DE | 692 15 254 T2 | 11/1996 |

(Continued)

*Primary Examiner* — Peter Macchiarolo  
*Assistant Examiner* — Alex Devito  
(74) *Attorney, Agent, or Firm* — Cozen O'Connor

(57) ABSTRACT

A level indicator having a support, a thick-film resistor network arranged on the support, a bow that carries a contact structure that produces, depending on the position of the bow, an electrical signal in the thick-film resistor network, a lever arm that is retained in the bow and has a float on its other end. The float has a seat for the lever arm. The lever arm has a pivoting range in a first plane. The float has a second plane that is perpendicular and that extends perpendicular to the first plane and through the center of mass of the float. The float is mounted on the lever arm to be positionally immobile. The seat for the lever arm is arranged in a region of the float which is arranged on the side of the second plane that faces away from the seat of the bow and that is delimited by the second plane and the outer periphery of the float.

11 Claims, 3 Drawing Sheets

(56) References Cited

U.S. PATENT DOCUMENTS

| | | |
|---|---|---|
| 5,333,499 A | 8/1994 | Gaston |
| 5,341,679 A * | 8/1994 | Walkowski et al. ............ 73/317 |
| 5,746,088 A * | 5/1998 | Sawert et al. .................. 73/313 |
| 6,216,534 B1 * | 4/2001 | Ross et al. ..................... 73/313 |
| 6,578,417 B1 * | 6/2003 | Eck ................................ 73/314 |
| 6,886,403 B2 * | 5/2005 | LaBarge et al. ............ 73/304 C |
| 7,222,529 B2 | 5/2007 | Pauer et al. |
| 2004/0007062 A1 | 1/2004 | Ireland et al. |
| 2004/0226366 A1 | 11/2004 | Pauer et al. |

FOREIGN PATENT DOCUMENTS

| | | |
|---|---|---|
| EP | 0 371 279 A1 | 6/1990 |
| EP | 0371279 | 6/1990 |
| EP | 0 417 907 A1 | 3/1991 |
| EP | 1452841 | 9/2004 |
| GB | 2 270 755 A | 3/1994 |
| GB | 2270755 | 3/1994 |

* cited by examiner

LEVEL INDICATOR

PRIORITY CLAIM

This is a U.S. national stage of application No. PCT/EP2008/053861, filed on Apr. 1, 2007, which claims Priority to the German Application No.: 10 2007 017 057.4, filed: Apr. 11, 2008; the contents of both being incorporated herein by reference

BACKGROUND OF THE INVENTION

1. Field of the Invention

The invention relates to a level indicator having a support, a thick-film resistor network arranged on the support, a bow that pivots with respect to the support and carries a contact structure that produces, depending on the position of the bow, an electrical signal in the thick-film resistor network, a lever arm that is retained in the bow at a first end and having a float on its other end, said float having a seat for the lever arm, and the lever arm having a pivoting range lying in a first perpendicular plane. Level indicators of this kind are used in motor vehicle fuel tanks.

2. Prior Art

Level indicators of this general type have been part of the prior art for a long time. The float is dimensioned such that it has at least two major surfaces, by which the float pivots with respect to the lever arm to be aligned parallel to the surface of the liquid. When the fuel tank is in its normal position and the filling level is low, i.e. at the minimum deflection of the lever arm, the float is aligned with its major surfaces horizontal and hence parallel to the bottom wall of the tank. This is achieved by the fact that the bore to receive the lever arm extends through the center of mass of the float.

After the level indicator is mounted in the fuel tank, the level indicator must be tested and, if necessary, calibrated. For this purpose, the fuel tank is swiveled. This swiveling is used to test the maximum and minimum deflection of the lever arm of the level indicator and the electrical signals produced thereby. Since testing is carried out without fuel, it often happens that, when the tank is swiveled into the normal position, the float does not come to rest with its major surface parallel to the bottom wall of the tank. Owing to this change in the position of the float, the bore and hence the end of the lever arm are not in the position of minimum deflection, and an erroneous signal is produced as a result.

In the prior art the float is mounted on the lever arm so as to be positionally immobile. However, this has the disadvantage that a float with a shape as described at the outset strikes against the top wall of the tank before it has even reached the maximum deflection of the lever arm. In addition to the erroneous indication of the filling level, the resulting noise is troublesome.

SUMMARY OF THE INVENTION

An object of the invention is to provide a level indicator which allows error-free testing and reliably indicates the maximum filling level.

According to one embodiment of the invention, the float has a second plane that is perpendicular and that extends perpendicular to the first plane which is defined by the pivoting motion of the lever arm, and through the center of mass of the float. The float is mounted on the lever arm to be positionally immobile. The seat for the lever arm is arranged in a region of the float arranged on the side of the second plane facing away from the mounting of the bow and that is delimited by the second plane and the outer periphery of the float.

The positionally immobile arrangement of the float on the lever arm ensures that the float reliably allows the minimum deflection of the lever arm, even when the fuel tank is swiveled for testing. The disadvantage of arranging the float on the lever arm so as to be positionally immobile causes the float to strike the upper boundary wall of the fuel tank before the lever arm reaches the pivoting angle for the maximum filling level is compensated for by re-positioning the seat in the float away from the center of mass. By virtue of this repositioning, the distance between the seat and the highest point of the float at the maximum deflection of the lever arm is less than it would be if the seat extended through the center of mass of the float. As a result, the lever arm swings out further upward and thus reach the pivoting angle which, relative to the thick-film resistor network, corresponds to a signal for the maximum filling level.

The lever arm preferably reaches the maximum deflection without the float striking the wall of the tank, which advantage is that this is achieved solely by changing the position of the seat in or on the float. There is no need for additional components for this purpose and, as a result, the level indicator according to the invention does not give rise to higher costs. The changed position of the seat does not require any additional outlay.

The seat is particularly simple if it is designed as a bore.

In another advantageous refinement, the seat is a slot arranged on the periphery of the float.

A particularly large pivoting range both for the minimum deflection and for the maximum deflection is achieved with a configuration in which the seat is arranged parallel to an axis of symmetry of the float.

The positionally fixed arrangement of the float on the lever arm is achieved with little outlay and without additional fastening elements by means of a slot on the periphery of the float, there being mounted in said slot a region of the lever arm that is arranged ahead of the end of the lever arm accommodated in the seat. The slot is preferably adapted to different installation locations, resulting in different positions, alignments and shapes.

To provide accurate indication of the filling level in a fuel tank that is almost empty, floats that do not extend far in the vertical direction have proven useful. In a refinement of the invention, floats of this kind, which moreover still have sufficient buoyancy, are of cuboidal design. According to another refinement, this effect is intensified by the float having two major surfaces, which form the top and bottom side of the float when the lever arm is in a position corresponding to the emptied fuel tank.

BRIEF DESCRIPTION OF THE DRAWINGS

The invention is explained in greater detail by means of a number of exemplary embodiments. In the drawings.

DETAILED DESCRIPTION OF THE DRAWINGS

Figure 1:
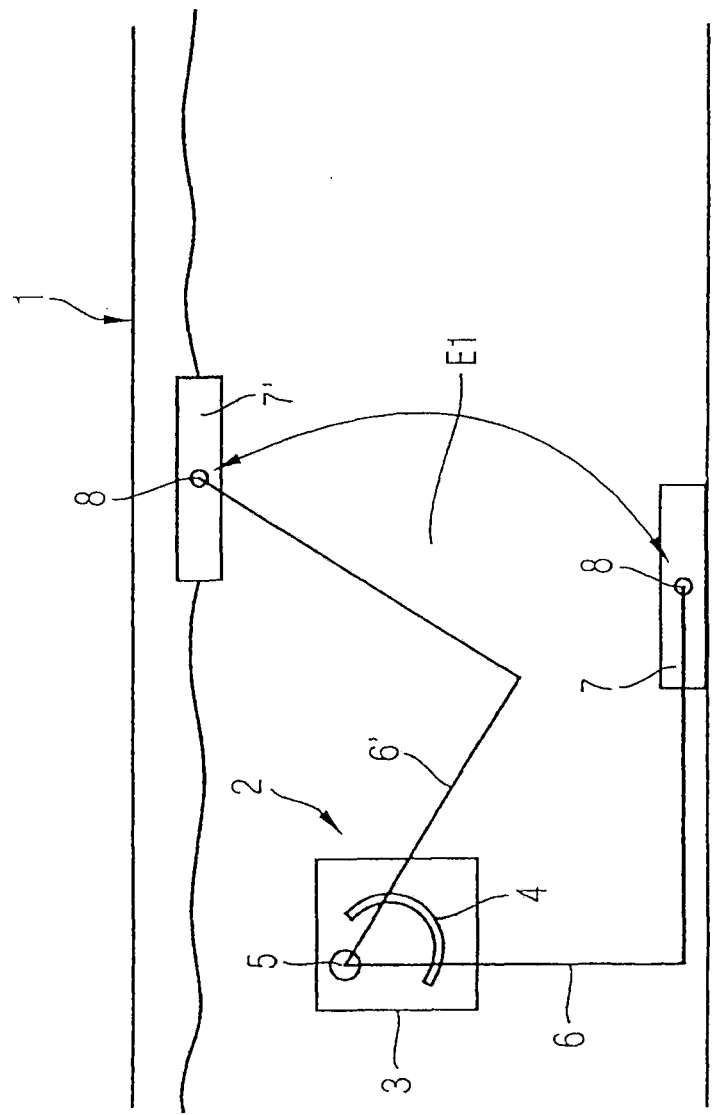
FIG. 1 is a schematic representation of a prior-art level indicator in a tank filled with fuel.

FIG. 1 depicts a fuel tank 1 of a motor vehicle (not shown more specifically) with a level indicator 2 arranged therein.

The level indicator 2 comprises a support 3, configured to secure the level indicator 2 to a surge pot of a delivery unit. Arranged on the support 3 is a thick-film resistor network 4, which produces a signal indicating the fill level of the fuel tank 1 by a contact structure on the thick-film resistor network 4. The contact structure is arranged on a bow 5 that is pivoted with respect to the support 3. Arranged on the support 3 is a lever arm 6 in the form of a lever wire that has a cuboidal float 7 at its free end. The float 7 has a seat 8 that is aligned horizontally and extends through the center of mass of the float 7. An end of the lever arm 6 is mounted in the seat 8 such that the float 7 can rotate freely about this end of the lever arm 6, which acts as a pivot. The lever arm 6 with the float 7 indicates the position when the fuel tank 1 is almost empty, while the position of the lever arm 6' with the float 7' corresponds to a fuel tank 1 that has been filled substantially to the maximum. The float 7, 7' is always substantially aligned parallel to the filling level due to its central pivotable mounting on the lever wire 6, 6'. As float 7, 7' pivots between the two end positions, the lever arm 6, 6' describes a first plane E1 that lies in the plane of the drawing.

Figure 2:
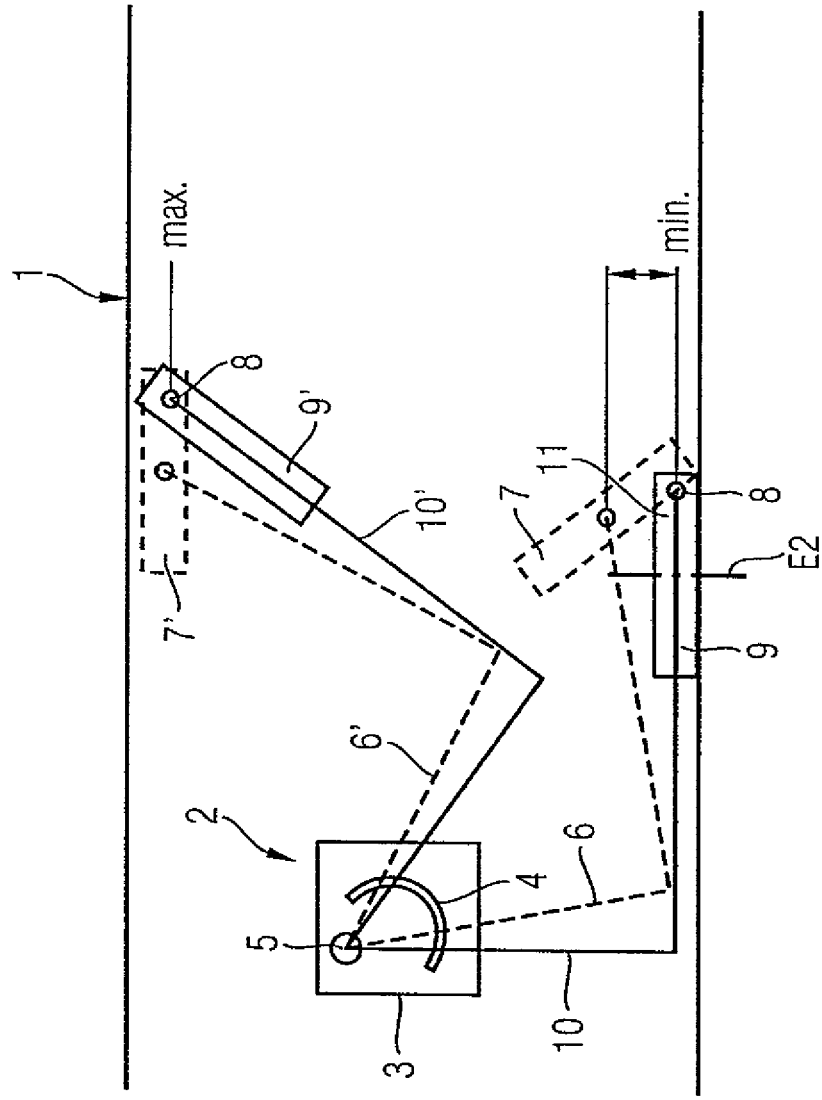
FIG. 2 is a schematic representation of a level indicator according to the invention and of a conventional level indicator in a fuel tank during calibration.

FIG. 2 depicts the fuel tank 1 without any fuel in it. To test and adjust the level indicator, especially the end positions, which correspond to a minimum filling level (min.) and a maximum filling level (max.), the fuel tank 1 is swiveled in an appropriate manner since to move the level indicator 2. The lever arm 6, 6' and the prior art pivotably mounted float 7, 7' of a conventional level indicator 2 are illustrated by a broken line. When the lever arm 6 is pivoted out of the installation position into the position corresponding to the maximum filling level, the lever arm 6' pivots into the position shown, the float 7' assuming the position illustrated owing to the upper boundary wall of the fuel tank 1. When the fuel tank 1 is swiveled back, the lever arm 6 pivots into the position corresponding to the minimum filling level. In many cases, the float 7 then remains in the alignment that the float 7' was in relative to the lever arm 6' if there is no force to align it parallel to the bottom of the fuel tank 1. The result is that the lever arm 6 does not pivot as far as the position for the minimum filling level due to the position of the float 7. Since the lever arm 6 is mounted in the bow 5 and said bow supports the contact structure that interacts with the thick-film resistor network 4, an erroneous signal for the minimum filling level is produced.

The level indicator 2 according to the invention differs from the level indicator 2 shown in FIG. 1 as regards the fixed arrangement of the float 9, 9' on the lever arm 10, 10'. Here, the float 9, 9' is mounted on the lever arm 10, 10' such that the cuboidal float 9 is aligned with its major surfaces parallel to the bottom of the fuel tank 1 and hence parallel to the filling level when the filling level is at its minimum (min.). At the maximum filling level (max.), the float 9' is not aligned parallel to the fuel level, but owing to its buoyancy and the arrangement of the seat 8 it does indicate the fill level accurately. The seat 8 is arranged horizontally. Seat 8 is arranged in a region 11 on an axis of symmetry of the float 9, 9', at a distance from the center of mass. On one side, the region 11 is delimited by a second plane E2, which is perpendicular and which extends through the center of mass of the float 9, 9' and is perpendicular to the first plane E1. On the other side, the region 11 is delimited by that area of the periphery of the float 9, 9' which faces away from the mounting of the bow 5.

Figure 3:
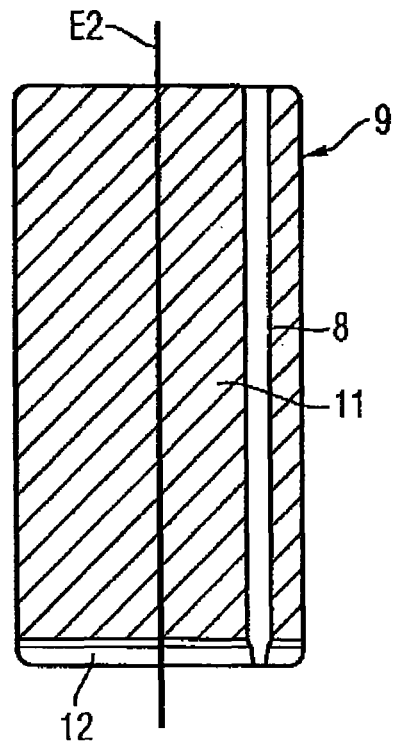
FIG. 3 is a cross section through a float shown in FIG. 2.

FIG. 3 is a cross section through the float 9, including the second plane E2, which extends through the center of mass of the float 9. The seat 8 for the lever arm is arranged in the plane of the section, at a distance from the second plane E2, preferably about 30% of the width of the float 9. A slot 12 on one side of the float 9, is arranged in the plane of the section, and to receives the lever arm 10, thereby defining the arrangement of the float 9 so as to be positionally immobile (fixed) relative to the lever arm 10.

Figure 4:
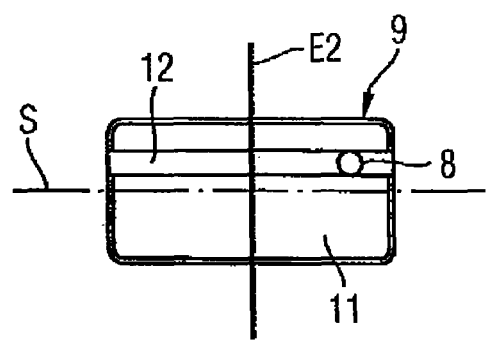
FIGS. 4 and 5 are side views of a float as shown in FIG. 2.

FIG. 4 is a side view of the float 9. The seat 8 for the lever arm is arranged above the axis S of symmetry and preferably at a distance from the second plane E2 of about 30% of the width of the float 9. The slot 12 in the side face of the float 9 runs in a substantially straight line parallel to the axis S.

Figure 5:
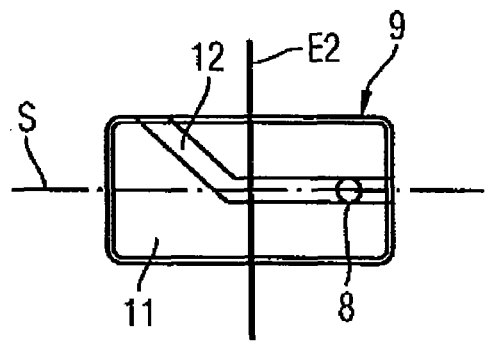

In the embodiment shown in FIG. 5, the seat 8 is arranged at a distance from the second plane E2 and on the axis S of symmetry of the float 9. The slot 12 for receiving the lever arm follows an angled path.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A level indicator comprising:
a support;
a thick-film resistor network arranged on the support;
a bow that is pivotable with respect to the support;
a contact structure carried by the bow, the contact structure configured to contact the thick-film resistor network to produce an electrical signal in the thick-film resistor network depending on a bow position;
a lever arm having a first end retained in the bow, the lever arm having a pivoting range lying in a first plane; and
a float immovably fixed to a second end of the lever arm, the float having a rectangular cuboid shape with first and second longitudinal ends, the first longitudinal end being farther from the bow than the second longitudinal ends, the float defining:
a seat for the second end of the lever arm arranged in a region of the float delimited by the first longitudinal end of the float and a second plane through a center of mass of the float, perpendicular to the first plane, the second plane being between the first and second longitudinal ends; and
a slot in a side of the float, the slot extending from the seat, away from the first longitudinal end of the float,
wherein a portion of the lever arm is arranged in the slot to immovably fix the float on the lever arm.

2. The level indicator as claimed in claim 1, wherein the seat is a bore extending into an interior of the float.

3. The level indicator as claimed in claim 1, wherein the float further comprises an axis of symmetry that extends through the center of mass of the float and the slot is arranged parallel to the axis of symmetry.

4. The level indicator as claimed in claim 1, wherein the float comprises two major surfaces configured to form a top and a bottom side of the float when the lever arm is in a position corresponding to the emptied fuel tank, the top and the bottom side of the float being configured to be substantially parallel to a bottom of the fuel tank.

5. The level indicator as claimed in claim 1, wherein the slot further comprises a second slot extending from the first slot at an angle, wherein a portion of the lever arm is arranged in the second slot.

6. A level indicator comprising:
a support;
a thick-film resistor network arranged on the support;
a bow that is pivotable with respect to the support;
a contact structure carried by the bow, the contact structure configured to contact the thick-film resistor network to produce an electrical signal in the thick-film resistor network depending on a bow position;
a lever arm having a first end retained in the bow, the lever arm having a pivoting range lying in a first plane; and
a float immovably fixed to a second end of the lever arm, the float having a rectangular cuboid shape with first and second longitudinal ends, the first longitudinal end being farther from the bow than the second longitudinal end, the float defining:
a seat for the second end of the lever arm arranged in a region of the float delimited by the first longitudinal end of the float and a second plane through a center of mass of the float, perpendicular to the first plane, the second plane being between the first and second longitudinal ends.

7. The level indicator as claimed in claim 6, wherein:
the lever arm pivots between a minimum deflection and a maximum deflection within the pivoting range; and
the seat is positioned so that the lever arm is movable between the minimum deflection when the filling level is at a minimum level and the maximum deflection when the filling level is at a maximum level, without the float striking a wall of a tank, during operation.

8. The level indicator as claimed in claim 6, wherein the float is at least partially solid and the seat is a bore extending into a solid portion of the float.

9. The level indicator as claimed in claim 8, wherein the bore is perpendicular to the first plane.

10. The level indicator as claimed in claim 2, wherein the bore is perpendicular to the first plane.

11. The level indicator as claimed in claim 3, wherein the axis of symmetry lies in a third plane perpendicular to the first and second planes, and the slot is arranged parallel to the third plane.

* * * * *